A. F. HILLKE.
PROCESS OF PRODUCING SULFATE OF AMMONIA.
APPLICATION FILED FEB. 2, 1915.
1,163,752. Patented Dec. 14, 1915.
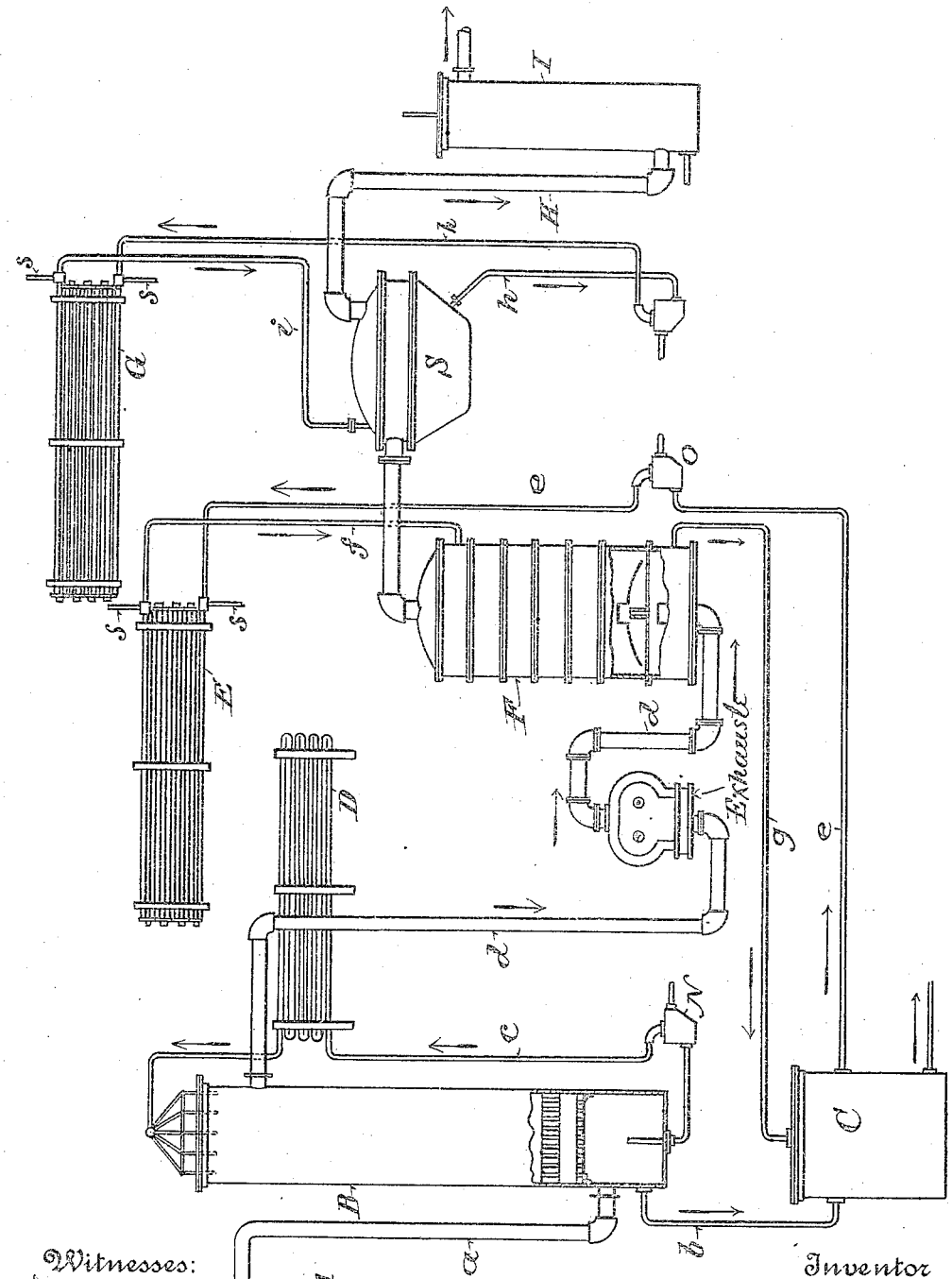

UNITED STATES PATENT OFFICE.

AUGUST F. HILLEKE, OF ENSLEY, ALABAMA, ASSIGNOR TO SEMET-SOLVAY COMPANY, OF SOLVAY, NEW YORK, A CORPORATION OF PENNSYLVANIA.

PROCESS OF PRODUCING SULFATE OF AMMONIA.

1,163,752.

Specification of Letters Patent.

Patented Dec. 14, 1915.

Application filed February 2, 1915. Serial No. 5,640.

*To all whom it may concern:*

Be it known that I, AUGUST F. HILLEKE, a citizen of the United States, residing at Ensley, in the county of Jefferson and State of Alabama, have invented a new and Improved Process of Producing Sulfate of Ammonia, of which the following is a specification.

My invention relates to the treatment of gas produced by the destructive distillation of coal to recover its ammonia content by the passage of gas through sulfuric acid to convert the ammonia into ammonium sulfate. Any process directed to this end requires the preliminary separation from the gas of those elements, such as tar, which in their relation to the ammonia may be classed as impurities and also the removal, in recoverable shape, of the fixed ammonia compounds, consisting mainly of chlorid of ammonia, which, if allowed to pass on and be broken up in the acid bath produces chlorin compounds with resulting destruction of the apparatus. The commercial success of any such process is also dependent on the practically complete recovery in the form of sulfate of the free ammonia content of the gas. In the processes heretofore employed for the direct recovery of the ammonia in this shape, all of which involve a preliminary washing of the gas, it has been necessary to give careful attention to the temperatures maintained, since in case of too low a temperature the ammonia goes into solution and fails to appear in the product and in case the temperature is too high an incomplete removal of the tar is effected.

The object of my improvements is to provide a process characterized by simplicity of operation, efficiency in the recovery of the ammonia content of the gas and in which there shall be considerable latitude in the range of temperature to which the gas is subjected.

The invention will be best understood by reference to the drawing forming a part hereof, which is a diagrammatic representation of an organization of apparatus which may be employed in practising the invention, reference being made thereto by means of the letters indicating the several parts.

In carrying the invention into effect the gas as it comes from the main, A, in which it is collected from the retorts or ovens is first scrubbed, by being showered with water, for which purpose the liquor or water of condensation from the gas is employed, as in a wash tower or scrubber, B. In this preliminary scrubbing the gas, which comes from the main at a temperature of approximately 80° C., is cooled. A notable proportion of its tar content is removed and much of the water carried thereby is condensed so that the fixed ammonia compounds, with more or less free ammonia, go into solution. The tar with water of condensation passes from the scrubber, B, into a tank C. In order to maintain the cooling of the gas a portion of the water of condensation is continuously cooled, as by being forced by pump, N, through cooling coils, D, showered with cold water, and returned to the top of the scrubber, B, to be again used in washing and cooling the gas. Thus a continuous circulation of cold water of condensation is maintained through the scrubber, B, and in contact with the gas therein.

The temperature attained by the gas in the scrubber, B, will not affect the ultimate result and any desired practicable reduction of temperature may be effected having regard to the working points upon which stress is laid. Thus the higher the temperature of the gas the less cooling of the wash water will be required, while the lower the temperature of the gas the more complete will be the removal of the tar at this point and the less power will be required to effect the movement of the gas through the apparatus. In practice my observation is that the highest convenience of operation is attained by cooling the gas to such an extent that it leaves the scrubber, B, at a temperature of from 30° C. to 45° C. After leaving the scrubber, B, the gas is heated to its initial saturation temperature and passed in contact with the water of condensation. The heating of the gas and its contact with the water of condensation is effected by passing water of condensation from the tank, C, as by means of a pump, O, through heating coils, E, where it is subjected to steam heat and from which it passes into the top of a wash column, F. The gas enters at the bottom of the wash column, F, and bubbles up through the hot water therein. The temperature of the gas is thus easily raised to, or even above, that of the gas as it enters the scrubber, B, and the water of condensation together with all its contained free ammonia is again taken up by the gas. Any tar remaining in the gas is removed by the passage of the gas through the water at this point and together with the unvaporized water flows back to the tank, C, through pipe, g.

By the foregoing a balance of operation is effected whereby the tar and fixed ammonia are removed from the gas and the entire amount of free ammonia is returned to and carried along with the gas to be subsequently utilized. It will be evident that a concentration of the fixed ammonia salts will take place and a portion of the solution of these may be drawn off from the tank, C, from time to time as required and subsequently treated as desired for the recovery of the contained salts. The water thus removed may be substituted by adding water from any source to the system as required. From the wash tower, F, the gas passes to a saturator, S, wherein its ammonia content combines with sulfuric acid to form sulfate of ammonia in the usual manner and the gas passes on to be collected and treated for utilization as desired. In case of undue accumulation of liquor in the saturator, S, with consequent dilution of the acid the liquor may be again returned to the gas by being pumped through heating coils, G, and thus vaporized and may be subsequently removed from the gas by cooling in any usual manner.

The advantages of my invention will be apparent since it provides a means by which the separate recovery of the tar and fixed ammonia as well as of all the free ammonia content of the gas is neatly and efficiently effected. The cooling and heating of the water of condensation by which the cooling and heating of the gas is effected is not dependent in any way on the gas temperature, but is done entirely outside of the gas circuit by independent means. Thus the minimum and maximum temperatures required can be easily and continuously attained with a correspondingly complete and continuous removal of the tar and fixed ammonia compounds and restoration of the free ammonia to the gas. Moreover, no indirect heating or cooling of the gas, a matter always difficult of accomplishment, is required and no critical observation of the temperature of the gas is call'd for, since the only absolute temperature necessary is that the gas shall be raised to its original saturation temperature, which is easily and certainly effected by the heating of the wash water in the coils, E.

What I claim as new and desire to secure by Letters Patent is:

1. The process of treating gas to recover its ammonia content which consists in washing and cooling the gas to remove tar and fixed ammonia compounds by cooling and continuously circulating in contact with the gas water of condensation from the gas, reheating and continuously circulating in contact with the gas the surplus water of condensation so as to reheat the gas and thereby vaporize and return to the gas the water of condensation and free ammonia and finally passing the gas through an acid bath to form ammonium sulfate.

2. The process of treating gas to recover its ammonia content which consists in washing and cooling the gas with water of condensation to remove the tar and fixed ammonia compounds, subsequently heating the gas in contact with the water of condensation to vaporize and restore to the gas the water of condensation and free ammonia, and, independently cooling and heating the water of condensation to the end of cooling and heating the gas thereby and finally passing the gas through an acid bath to form ammonium sulfate.

3. The process of treating gas to recover its ammonia content which consists in washing and cooling the gas to remove tar and fixed ammonia compounds, cooling water of condensation independently of the gas and continuously circulating the same in contact with the gas, heating the water of condensation independently of the gas and washing the gas therewith whereby the gas is heated and the water of condensation is vaporized and, together with the free ammonia, is restored to the gas, and finally passing the gas through an acid bath to form ammonium sulfate.

4. The process of treating gas to recover its ammonia content which consists in washing and cooling the gas to remove tar and fixed ammonia compounds by cooling and continuously circulating in contact with the gas water of condensation from the gas, reheating and continuously circulating in contact with the gas the surplus water of condensation so as to reheat the gas, and thereby vaporize and return to the gas the water of condensation and free ammonia, passing the gas through an acid bath to form sulfate of ammonia and finally vaporizing and thus returning to the gas the water condensed in the bath.

In testimony whereof, I have hereunto subscribed my name, this 14th day of January, A. D. 1915.

AUGUST F. HILLEKE.

Witnesses:
EUGENE S. MILLER,
AUGUSTUS G. OVERTON.